United States Patent [19]

Kasik et al.

[11] 3,941,891

[45] Mar. 2, 1976

[54] SYNERGISTIC COMBINATION CHEESE EXTENDER

[75] Inventors: Robert L. Kasik, Berwyn; Marvin A. Peterson, Park Ridge, both of Ill.

[73] Assignee: Beatrice Foods Co., Chicago, Ill.

[22] Filed: Apr. 28, 1975

[21] Appl. No.: 572,189

Related U.S. Application Data

[63] Continuation-in-part of Ser. No. 455,510, March 27, 1974.

[52] U.S. Cl. .................. 426/94; 426/573; 426/582; 426/585; 426/613; 426/657
[51] Int. Cl.$^2$............................................. A23J 3/02
[58] Field of Search ........... 260/119, 120; 426/573, 426/582, 585, 613, 656, 657

[56] References Cited
UNITED STATES PATENTS

| | | | |
|---|---|---|---|
| 3,635,737 | 1/1972 | Baron | 426/582 X |
| 3,674,500 | 7/1972 | Nagasawa et al. | 260/119 |

*Primary Examiner*—A. Louis Monacell
*Attorney, Agent, or Firm*—Cushman, Darby & Cushman

[57] ABSTRACT

A cheese extender comprised of a congealed mixture of a synergistic combination of sodium caseinate and potassium caseinate, fat and water. The weight ratios of the caseinates to fat are from 1:2 to 2:1 and the weight ratios of water to the total of the caseinates and fat are from 1:2 to 3:1. The ratios of the sodium caseinate to potassium caseinate are 4:1 to 1:4. The ingredients are heated to at least partially solvate the caseinates and then cooled to form the congealed mixture which closely resembles mozzarella cheese in texture and mouth-feel.

33 Claims, No Drawings

SYNERGISTIC COMBINATION CHEESE EXTENDER

This is a continuation-in-part of co-pending application Ser. No. 455,510, filed on Mar. 27, 1974.

The present invention relates to cheese substitutes and/or extenders and methods for production and use thereof. More particularly, the invention relates to cheese substitutes and/or extenders which, when heated, exhibit the property of stringing similar to natural mozzarella cheese.

BACKGROUND OF THE INVENTION

In the last fifteen years, the per capita consumption of Italian style cheese has increased approximately tenfold. While there has been a significant increase in the consumption of traditional Italian style cheeses, such as romano, parmesan and ricotta, by far the most dramatic increase in United States consumption of Italian style cheese has been in connection with mozzarella. This has been due to the unusually rapid popularization of pizza in the United States. Mozzarella cheese is, by far, the most dominant cheese used in producing pizza, with provolone cheese constituting the next most significant pizza cheese.

The amount of other cheeses used in the production of pizza has been relatively insignificant compared with the amount of mozzarella cheese because of the unique stringy characteristic of heat plasticized mozzarella cheese. Other types of cheese cannot produce this same stringy effect, and the consuming public will not, generally, accept a cheeze pizza which does not exhibit the characteristic of stringiness. Additionally, the mozzarella cheese has a distinctive and relatively clear taste which cannot be duplicated by other cheeses. Just as important, the clear taste does not override the taste of spices and other flavors used in pizza preparation, as is the case in other cheeses which have stronger and more lingering flavors. For example, while cheddar cheese or provolone cheese can produce some stringiness in a heated pizza, the flavors of these cheeses so override the flavors of the pizza spices that the consuming public does not, generally, accept these cheeses as substitutes for mozzarella cheese.

The substantial increase in demand for mozzarella cheese has not only caused difficulties in obtaining predictable supplies thereof, but has significantly increased the cost of the mozzarella cheese. In view thereof, the art has sought means for supplementing or extending (or indeed replacing) the mozzarella cheese used in pizza production wherein the desired characteristics of the mozzarella cheese, as discussed above, are preserved. However, these efforts have met with only partial success. Such supplements or extenders have not been able to accurately reproduce the stringy characteristic of mozzarella cheese and/or they have undesired flavors. Additionally, since the relatively bland and clear flavor of mozzarella cheese has not been accurately reproduced, the supplements or extenders often either mask the pizza spice flavors or overwhelm the mozzarella cheese flavor.

A primary difficulty in providing acceptable cheese extenders resides in the unavailability of a relatively low cost protein source, but which protein source has a relatively bland and clear taste. Protein is generally necessary in acceptable cheese extenders in order to provide the basic background taste and consistency associated with the protein content of cheese. Caseinates are widely used as a protein source in foodstuffs.

Caseinates are generally recognized as the product produced by precipitating protein from milk or milk products with acids to produce acid casein and then at least partially neutralizing the acid casein with an alkali. The so-produced product is conventionally referred to as the caseinate of the corresponding alkali. The acid casein may be precipitated with or without the acid of a milk clothing enzyme, e.g., a rennet enzyme. For example, the acid casein may be produced by adding lactic acid to milk or milk fractions, or lactic acid may be produced in situ from organisms grown therein, and the corresponding lactic casein will precipitate. Alternately, a mineral acid, such as hydrochloric acid, may be added to the milk or milk fraction to precipitate the acid casein. The acid casein is then conventionally treated with sodium hydroxide to form sodium caseinate.

Both acid casein and the sodium caseinate contain over 90% protein and, thus, can function as a protein source. However, acid casein has a relatively unpleasant "acid" taste and can be used in food-stuffs in only relatively small proportions. On the other hand, while sodium caseinate does not have the unpleasant acid taste, it has a relatively unpleasant consistency in the mouth (referred to as mouth-feel), i.e., a somewhat soapy mouth-feel. In view thereof, the amount of acid casein which may be acceptably added to foodstuffs is considerably limited and only about 5% of sodium caseinate may be acceptably used since otherwise the unpleasant mouth-feel will adversely affect consumer acceptance of the foodstuff.

In co-pending applications Ser. Nos. 276,168 and 276,169, both filed on July 28, 1972, processes are described for improving the blandness of caseinates. In one process, sodium caseinate is slowly heated with a salt such as magnesium chloride and in the other process, the caseinate is rapidly mixed with a hot solution of the salt. In copending application Ser. No. 455,511, filed on Mar. 27, 1974, casein granules are treated with a magnesium base. The first two of these processes do considerably improve the blandness of the caseinates and allow the use thereof in very substantial quantities in foodstuffs. The third of these processes produces a product which may be referred to as magnesium caseinate. Caseinates produced by the first two processes, while being exceptionally bland, do retain the characteristic consistency of the caseinate. Thus, while the sodium caseinate produced is most bland, it still produces the undesirable soapy mouth-feel, and again, the amounts which may be used in foodstuffs of even the bland sodium caseinates is limited, where that soapy mouth-feel can be detected in the food composition.

The magnesium caseinate prepared according to the aforementioned application, was discovered to have unusual properties, among which allowed the use thereof in producing a novel cheese extender. Additionally, the magnesium caseinate could be combined with potassium caseinate and still obtain acceptable results. It was further discovered that even potassium caseinate provided a superior extender, as compared with sodium caseinate and calcium caseinate. These extenders are described in co-pending application Ser. No. 455,510, filed on Mar. 27, 1974.

The disclosures of all of the aforementioned applications are incorporated herein by reference and relied upon for their disclosures.

While the cheese extenders of the above-identified application provide exceptionally good results, they do suffer from economic difficulties. Neither magnesium caseinate nor potassium caseinate is available in commercial quantities. Thus, those caseinates must be specially produced and limited productions thereof, of course, increase the unit cost of the caseinates used in the cheese extender and, hence, the cost of the cheese extender itself. Additionally, magnesium caseinate is not a presently approved caseinate for human consumption, although all evidence points to the total acceptability thereof. Further, when potassium caseinate is used as the cheese extender, while the resulting extender is far superior to an extender based on either sodium caseinate or calcium caseinate, the extender is clearly inferior to that based on magnesium caseinate or a combination of magnesium caseinate and potassium caseinate. Accordingly, the superior extenders all require the presence of magnesium caseinate, which causes the economic difficulties noted above.

For the foregoing reasons, it would be advantageous to provide a cheese extender or supplement for mozzarella cheese which preserves the essential appearance, texture and character of mozzarella cheese, but which does not adversely affect the flavor of pizza produced therefrom and which does not have the economic disadvantages noted above.

OBJECTS OF THE INVENTION

It is, therefore, an object of the present invention to provide a mozzarella cheese supplement or extender which can be used in major amounts with, or totally replace, the mozzarella cheese used in producing pizza and other food products. It is a further object of the invention to provide such extenders wherein the stringy characteristic of the mozzarella cheese is preserved. It is yet a further object of the invention to provide such products wherein the flavor of the extender does not mask or override the pizza spice flavors. It is yet a further object of the invention to provide such an extender in a very convenient-to-use form which can be easily transported, stored and utilized. It is a further object of the invention to provide methods for producing such extenders. Lastly, it is an object of the invention to provide methods of use for such extenders and foods containing the extenders. Other objects will be apparent from the following disclosures and claims.

BRIEF DESCRIPTION OF THE INVENTION

Very briefly stated, it has now been discovered that a congealed (gelled) mixture of a synergistic combination of sodium caseinate and potassium caseinate, fat and water can produce a mozzarella cheese extender which provides the stringy characteristic of mozzarella cheese and is of such flavor that the pizza spices and the mozzarella cheese flavor are not masked by the extender. Further, the extender can be substituted either in major amounts or totally for the mozzarella cheese used in making pizza, especially when a cheese-like flavor is incorporated into the extender.

The invention is based on the essential discovery that while sodium caseinate alone provides a very undesirable protein source for cheese extenders and while potassium caseinate alone provides a minimally acceptable protein source for cheese extenders, unexpectedly certain combinations of sodium caseinate and potassium caseinate give results far superior to sodium caseinate alone and substantially superior to potassium caseinate alone. Thus, the invention is based upon the discovery of a synergism that exists with certain ratios of sodium caseinate and potassium caseinate in producing cheese extenders of the type disclosed in co-pending application Ser. No. 455,510. This discovery allows the replacement of the magnesium based protein sources of that application with the present synergistic combination of sodium and potassium based protein sources and yet provide a most acceptable cheese extender. At the same time, this synergistic combination of caseinates as the protein source allows substantial utilization of commercially available sodium caseinate and the use of FDA approved potassium caseinate for producing the cheese extender and, thus, obviating the economic difficulties noted above.

The desirable properties of the present invention are provided by the synergistic combination when the ratio of sodium caseinate to potassium caseinate is from 3:1 to 1:3. However, if somewhat reduced properties are acceptable for certain applications, a large measure of the advantages of the invention can be realized when the ratio of sodium caseinate to potassium caseinate is as wide as 4:1 to 1:4, and this broader range is considered part of the present invention, although not a preferred form thereof.

DETAILED DESCRIPTION OF THE INVENTION

The present cheese substitute and/or extender may be formulated in the same manner as disclosed in co-pending application Ser. No. 455,510, and the disclosure therein is incorporated herein by reference for those purposes. In the present extender, however, the present synergistic combination of sodium caseinate and potassium caseinate is substituted for the magnesium caseinate and/or potassium caseinate of that co-pending application.

The source of the present synergistic combination of sodium and potassium caseinate is not critical. For example, commercially available sodium caseinate may be used or the sodium caseinate may be prepared by the method explained above, i.e., precipitation of acid casein and subsequent neutralization. While potassium caseinate is not available in commercial quantities, it is available on the market and may be obtained in limited quantities. However, again, the potassium caseinate may be prepared by the conventional method discussed above, i.e., precipitation of the acid casein and neutralization thereof with a potassium base, such as potassium hydroxide.

Alternately, the synergistic combination of sodium caseinate and potassium caseinate may be produced in situ. Thus, the precipitated acid casein may be neutralized with a combination of sodium and potassium bases such as to provide the resulting ratio of sodium and potassium caseinate according to the present invention. For example, equal weight amounts of sodium hydroxide and potassium hydroxide may be used for neutralizing acid casein to provide the synergistic combination of sodium caseinate and potassium caseinate, according to the present invention. Of course, in each of these processes, conventional purification steps may be practiced if desired, e.g., washing with cold water, reprecipitation, etc.

Thus, the source of the present synergistic combination is either available on the market or well within the production capabilities of those skilled in the art and no further description thereof is necessary.

The fat which is used to produce the present cheese substitute or extender may be any relatively low melting point vegetable or animal fat, so long as the fat has essentially a bland taste and is a liquid at a temperature of less than 130°F. (melting point of less than 130°F.). Preferably, the melting point is between 20°F. and 130°F., e.g., between 40°F. and 125°F., or between 50°F. and 120°F. However, since some animal fats, especially butter fat, are more difficult to preserve, the preferred form of the invention is the use of vegetable fat such as derived from coconuts, soybeans, safflower, corn, cotton, etc.

The relative proportions of synergistic combination of caseinates to fat, as can be appreciated, are such that the ingredients will form a gel, either alone or in combination with natural mozzarella cheese, and will provide the stringy characteristic of natural mozzarella cheese. Thus, in order to mimic the stringy characteristic of mozzarella cheese, the weight to weight ratio of the synergistic combination of caseinates to fat must be between 2:1 and 1:2 and best results are obtained when this ratio is between 1:1.5 and 1.1:1, e.g., 1:1.

Also, in order to provide the stringy characteristic, the extender must have substantial amounts of water incorporated therein and result in a congealed mixture. The weight to weight ratio of water to the total of the synergistic combination of caseinates and fat must be within 1:2 to 3:1, especially 1.5:1 to 1:1.5, e.g., 1.25:1 to 1:1.25, and particularly 1:1.

Thus, the essentials of the present cheese substitute and/or extender composition are a congealed mixture of: a synergistic combination of sodium caseinate and potassium caseinate; a fat having a melting point of 130°F. or less; and water; the weight ratio of the synergistic combination of fat being from 1:2 to 2:1, the weight ratio of water to the total of the synergistic combination and fat being from 1:2 to 3:1, and the ratio of sodium caseinate to potassium caseinate in the synergistic combination being from 4:1 to 1:4.

While not necessary to achieve the major advantages of the present invention, it is most desirable, and indeed a preferred embodiment of the invention, where the composition contains a gel stabilization agent. The gel stabilization agent functions as a sol stabilizer for the gel system. In this regard, the stabilizer must be a non-toxic, relatively tasteless, water soluble ionic compound. The ions function in the solvated aqueous composition for stabilizing the gel and improving handling properties. Thus, suitably, the stabilizing agent may be simply sodium chloride or potassium chloride, although other ionic compounds may be used if desired. The amount of the stabilizer in the composition may vary widely, but it generally will be contained in an amount between ½% and 4% by weight of the total composition, e.g., about 2%.

Also, while not required, it is most desirable, and a preferred embodiment of the invention, for the composition to be adjusted in pH such that a pH of about 5.4 to 5.8 is achieved, although pHs of about 5.0 to about 6.0 will still provide some measure of the advantages of this preferred form of the invention. Optimumly, however, the pH will be about 5.6 to 5.7. The pH may be adjusted with any non-toxic acid (or base if an acidic caseinate is used). Generally speaking, however, conventional food grade acids are preferred. Lactic acid is a very convenient food grade acid and constitutes the preferred form of the pH adjustment acid.

The extender may contain other ingredients if desired. However, the total of the synergistic combination of caseinates and fat should comprise at least 50% of the total solids of the extender composition, preferably at least 60% to 75%, and more preferably at least 90% to 92%. The remaining ingredients can be conventional flavorings such as butter oils and lipolyzed butter oils, butyric acid, etc., certified food colorings and tinting agents such as carotene and titanium dioxide preservatives, such as BHT. Conventional processing aids may also be added to promote mixing of the ingredients and ease in forming the gel. In this regard, from 0.1% to 0.5% by weight of a magnesium salt, e.g., magnesium hydroxide (calculated as magnesium), based on the total weight of the caseinates will aid in forming a smooth and lump-free gel with the caseinates. If desired, the magnesium processing aid may be added in the form of magnesium caseinate, which is commonly referred to as a salt. Alternately, any non-toxic relatively soluble magnesium compound may be used, e.g., magnesium acetate, chloride, lactate, nitrate and carbonate.

The basis of the present synergistic effect is not fully understood, but it is believed that this effect is a result of the unexpected ability of sodium caseinate to substantially mitigate the undesired gummy mouth-feel of potassium caseinate, while, on the other hand, the potassium caseinate has the ability to substantially mitigate the soapy mouth-feel of the sodium caseinate. In other words, potassium caseinate, with the gummy mouth-feel, and sodium caseinate, with the soapy mouth-feel, are not acceptable alone, but in combination, these two undesired mouth-feels combine to produce a resulting mouth-feel which is quite acceptable. By using a relatively bland form of the caseinates, the present synergistic combination will provide not only a bland taste but a very acceptable mouth-feel and, thus, obviates the difficulties in using these protein sources alone, according to the knowledge in the prior art.

As noted above, weight ratios of sodium caseinate to potassium caseinate may vary as widely as 4:1 to 1:4, but is preferably between 3:1 to 1:3. Contrary to what one might expect, however, the optimum proportions do not fall near the mid-point of this range. It has been found that the optimum proportions are 3 parts of sodium caseinate to 7 parts of potassium caseinate, thus, indicating that the optimum is very close to the extreme of one end of the preferred range. Stated another way, it has also been found that the proportion of potassium caseinate, for optimum results, must be substantially greater than the proportion of sodium caseinate, e.g., in the range of about 2:1.

It is also an important feature of the present invention that the extender can be produced, packaged, stored, and shipped in a dried form, i.e., without the necessary water, and the water can be added just prior to reconstituting the dry extender ingredients for use with mozzarella cheese. This saves considerably on the difficulty and expense of transporting and storing the present extender as opposed to naturally produced mozzarella cheese which must be transported and stored under refrigerated conditions. For this purpose, "in a dried form" means that the composition is dried until it has a water content of less than 10% by weight, e.g., less than 8% or even 6%.

The dry extender ingredients may be prepared by forming a suspension of emulsion of the synergistic combination and fat, along with desired optional ingredients as noted above, and then drying, e.g., spray drying (1500 psig nozzle pressure, 290°F. inlet, 190°F. outlet) to a free-flowing, non-sticky powder. Alternately, the dry ingredients and fat can simply be mechanically mixed, e.g., a Votator mixer. Similarly, the sodium caseinate or potassium caseinate may be spray dried, alone or co-dried, to a powder in the same manner. Thus, acid casein may be essentially neutralized with sodium and potassium bases and co-dried to the synergistic combination of caseinate. Therefore, considerable latitude can be utilized in preparing the extender.

Alternately, the ingredients may be stored separately and mixed just prior to gelling the ingredients with water and incorporation therein of mozzarella cheese, if desired.

Mozzarella cheese may be added to either of the above described dry mixtures. Of course, if the mozzarella cheese is added in the natural form, the dry compositions will no longer be storage stable. If it is desired to produce a storage stable composition with mozzarella cheese therein, the composition with the natural cheese (or just the cheese) can be spray dried and the entire spray-dried composition reconstituted with water and gelled just prior to use in pizza production.

The extender may totally replace the natural mozzarella cheese in food compositions, e.g., pizza, but it is preferred that the extender, if not artificially flavored, be used in ratios between 1:10 and 10:1 with natural cheese (on a solids basis). Good mixtures in this regard will be between 1:5 and 5:1, especially 1:2 and 2:1, i.e., 1:1.

It should be understood that the present composition, when prepared for immediate use as opposed to in the dry form, is a congealed mixture of the defined synergistic combination of caseinates, fat and water. In this context, the term "congealed" is defined as a homogeneous mixture with no visibly detectable different phases, i.e., the water, caseinates and fat are not in visible, discernably different phases. Accordingly, it is clear that the term does not include a simple mechanical mixture of the ingredients, and, indeed, the composition is best described as a gel. While not bound by theory, it appears that the caseinates are sufficiently solvated by the water to act as a semi-solid emulsifier for the fat and water, i.e., it is gellable.

The caseinates appear to far more rapidly solvate at elevated temperature, which allows the required gel formation to be more rapidly produced. Therefore, the caseinates should be mixed with the fat and water at temperatures of at least 120°F. to 130°F., especially at least 140°F., e.g., 150°F. or 160°F. Temperatures up to 212°F. or higher may be used, but, at these temperatures, the caseinates can begin to denature. Thus, it is preferred that the mixing be at temperatures of less than 205°F., especially less than 185°F. or 190°F. A preferred temperature is 180°F.

On cooling, e.g., below 95°F., especially below 80°F., the heated mixture of the caseinates, fat and water congeals to form the gel-like solid. The cooled and congealed mixture has the physical appearance and properties of mozzarella cheese, i.e., somewhat elastic, or rubbery, a coherent feel in the mouth, meltable and heat plasticizable to a stringy character. At cooler temperatures, e.g., 75°F. or 60°F. or less, these characteristics are accentuated. Thus, for improved grating, temperatures between 40°F. and 55°F. may be used.

The invention will be illustrated by the following examples, where all amounts and ratios are by weight, as is also in the claims, but it is to be understood that the invention is not limited to the specific examples, but extends to the breadth described above.

EXAMPLE I

Preparation of the Extender

Mozzarella cheese extender was prepared in the following manner.

Twenty-two parts of hydrogenated soybean oil (95°F. melting point) were heated to 180°F.; 0.25 parts of lipolyzed butter oil and 0.05 parts of titanium dioxide were added with stirring to the hot oil. To this mixture was added 25 parts of a mechanical mixture of 7 parts by weight of potassium caseinate and 3 parts by weight of sodium caseinate. With stirring, the caseinates were dispersed in the hot fat. Forty-nine parts of water were heated to 160°F. and then added thereto were 2 parts of salt (NaCl), 1.5 parts of lactic acid (88%), 0.3 parts of sodium lactate (50%), and coloring.

With steady agitation, the water mixture was added to the fat-protein dispersion and a homogeneous mixture was produced (no free fat or water) in about 4 to 5 minutes. The hot product was poured into 5-pound loaf molds and cooled to 50°F. where a firm product resulted. The cooled product had the consistency, feel and general appearance of mozzarella cheese.

EXAMPLE II

Preparation Of Cheese Pizza

Traditional pizza dough was prepared by mixing flour, salt, solid vegetable shortening, scalded milk and dried yeast. The dough was allowed to raise in the conventional manner and rolled into an unbaked pizza crust. The crust was lightly brushed with olive oil and traditional pizza sauce was placed thereon. The sauce was prepared by mixing mascerated tomatoes, minced garlic, minced onion, olive oil, oregano, freshly ground black pepper and red pepper flakes. Onto the pizza sauce was placed a mixture of grated mozzarella cheese and the product of Example I in a similar grated form. The weight ratio of the mozzarella cheese and the product of Example I was 1 to 1.

Thereafter, the pizza was baked at 420°F. for twenty minutes. The cheese of the baked pizza was white, of a milky translucent appearance and, when pulled, stringed in a manner substantially the same as mozzarella cheese.

As a comparison, a pizza was prepared in the same manner as described above, except that the extender of Example I was not used, and the corresponding amount of natural mozzarella was used in its place. The all-mozzarella cheese pizza could not be distinguished by most test observers from the pizza with the present extender in terms of its appearance, stringiness, or other physical characteristics.

EXAMPLE III

Example I was repeated except that the extender had incorporated therein a mozzarella cheese flavor produced according to the method of U.S. Pat. No. 3,667,968 in an amount of 15% by weight of the extender. In this case, the flavor and the physical characteristics of the pizza produced with the extender were substantially indistinguishable from the pizza produced with all mozzarella cheese.

EXAMPLE IV

In order to demonstrate the criticality of the ratios of the present synergistic proportions of sodium caseinate and potassium caseinate, the procedure of Example I was repeated, except that in lieu of the mechanical mixture of 7 parts by weight of potassium caseinate and 3 parts by weight of sodium caseinate, the following ratios of sodium caseinate and potassium caseinate were used. (Note that the control is the ratio of Example I).

| Experiment | Part/Weight Na-Caseinate | Parts/Weight K-Caseinate |
|---|---|---|
| A | 1 | 3 |
| B | 1 | 2 |
| C | 1 | 1 |
| D | 2 | 1 |
| E | 3 | 1 |
| F | 4 | 1 |
| G | 1 | 4 |
| CONTROL | 3 | 7 |

As noted hereinbefore, the control has the preferred ratio of sodium caseinate to potassium caseinate and each of Experiments A through G were compared with the control in terms of blandness of flavor, acceptability of mouth-feel, stringiness and heat plasticization at 420°F. The properties of the extender of Experiment A were very close to the properties of the control, although a more gummy texture in the mouth-feel was a detectable. The characteristics of Experiment B were also quite close to the control, but, in this case, the gummy texture of Experiment A was not detectable, but a slightly more fluid mouth-feel was detectable. In Experiment C, the more fluid mouth-feel became more pronounced and in Experiment D, the fluidity was more detectable but, additionally, a very slight soapy mouth-feel was detectable. In Experiment E, the fluidity further increased, as did the soapy mouth-feel, and at these proportions, most tasters agreed that no increase in fluidity and soapy mouth-feel would be acceptable. However, some tasters concluded that the fluidity and soapy mouth-feel were at acceptable maximum levels with the composition of Experiment E, i.e., 4 parts sodium caseinate to 1 part potassium caseinate. Beyond this level, however, all tasters agreed that the fluidity and soapy mouth-feel became objectionable. Likewise, some tasters concluded that the gummy mouth-feel of Experiment G with 1 part sodium caseinate and 4 parts potassium caseinate was still acceptable, but that greater amounts of potassium caseinate would not be acceptable.

Thus, the broader range for all proportions for the synergistic combination of sodium caseinate and potassium caseinate is 4:1 to 1:4, although to ensure that essentially all tasters will find the cheese extender to be totally acceptable, it is preferred that the ratio be between 1:3 and 3:1.

EXAMPLE V

The procedure of Example I was repeated except that the titanium dioxide and the sodium lactate were deleted and replaced by 0.05 parts of potassium sorbate and 0.1% of magnesium hydroxide (based on the weight percent of magnesium ion to the total caseinate). After adding the water, the pH was approximately 5.6 to 5.7 and the steady agitation rapidly produced a homogeneous mixture with essentially no lumps. After forming into loaf molds and cooling, the gel structure was particuarly stable, smooth and translucent.

An analysis of a suitable composition of the foregoing nature, on a dry basis, will show the following: sodium/potassium caseinates, as the metal, potassium equals 1 to 2 parts by weight per 100 and sodium 0.5 to 1.5 parts by weight per 100; magnesium, as the metal, about 0.07 to 0.4.

EXAMPLE VI

The procedure of Example I was repeated except that the water was rapidly added to the fat-protein dispersion and after a rapid mixing was spray dried in a conventional box sprayer (1500 psig nozzle pressure, 290°F. inlet, 190°F. outlet) to a free-flowing non-sticky powder, which was water re-dispersible and congealable to the cheese extender.

The invention has been described above, but it is apparent to those skilled in the art that modifications thereof may be practiced and it is intended that those modifications be embraced within the spirit and scope of the following claims.

What is claimed is:

1. A cheese extender composition comprising a congealed mixture of:
    a synergistic combination of sodium caseinate and potassium caseinate;
    a fat having a melting point of 130°F. or less;
    and water;
    the weight ratio of the synergistic combination to fat being from 1:2 to 2:1, the weight ratio of water to the total of the synergistic combination and fat being from 1:2 to 3:1, and the ratio of sodium caseinate to potassium caseinate in the synergistic combination being from 4:1 to 1:4, whereby the composition exhibits the stringy characteristic, texture and mouth-feel similar to that of natural mozzarella cheese.

2. The composition of claim 1 having admixed therewith an artificial mozzarella cheese flavor.

3. The composition of claim 1 wherein the ratio of water to the total of the synergistic combination of caseinates and fat is between 1.5:1 and 1:1.5.

4. The composition of claim 1 wherein the ratio of caseinates to fat is between 1.5:1 and 1:1.5.

5. The composition of claim 1 wherein the fat has a melting point between 20°F. and 130°F.

6. The composition of claim 1 wherein the total of the synergistic combination of caseinates and fat constitutes at least 50% by weight of the solids content of the extender composition.

7. The composition of claim 6 having admixed therewith a flavoring or coloring agent.

8. The composition of claim 1 in a dried form containing less than 10% by weight of water.

9. The composition of claim 1 having admixed therewith a natural cheese.

10. The composition of claim 9 wherein the natural cheese is mozzarella cheese.

11. The composition of claim 10 in a dried form containing less than 10% by weight of water.

12. The composition of claim 1 wherein the synergistic combination of caseinates is a mechanical mixture of sodium and potassium caseinates.

13. The composition of claim 1 wherein the synergistic combination of caseinates is produced by in situ treatment of acid casein with a mixture of sodium and potassium bases.

14. The composition of claim 1 wherein the fat is a vegetable fat.

15. The composition of claim 6 wherein the total of the caseinates and fat constitutes at least 75% by weight of the solids content of the extender composition.

16. The composition of claim 9 wherein the amount of the composition admixed with the natural cheese is within the ratio of 1:10 to 10:1.

17. The composition of claim 16 wherein the ratio of composition to natural cheese is 1:5 to 5:1.

18. The composition of claim 1 which also contains a gel stabilizer.

19. The composition of claim 18 in which the gel stabilizer is a water-soluble, non-toxic, ionic salt.

20. The composition of claim 19 in which the salt is NaCl.

21. The composition of claim 1 which also contains a magnesium based processing aid.

22. The composition of claim 21 in which the processing aid is a magnesium salt.

23. The composition of claim 22 in which the processing aid is magnesium oxide.

24. The composition of claim 22 in which the processing aid is magnesium caseinate.

25. The composition of claim 1 in which the composition contains a pH adjusting agent.

26. The composition of claim 25 in which the pH adjusting agent is a non-toxic acid.

27. The composition of claim 26 in which the pH adjusting agent is a lactic acid.

28. A composition comprising a synergistic combination of sodium caseinate and potassium caseinate and a fat having a melting point of 130°F. or less; the weight ratio of the caseinates to fat being 1:2 to 2:1; wherein the ratio of sodium caseinate to potassium caseinate is 4:1 to 1:4 and the composition is reconstituteable with water in a weight ratio of water to the total of the caseinates and fat of between 1:2 and 3:1 to provide a congealed mixture having properties similar to natural mozzarella cheese.

29. The composition of claim 28 in a spray-dried form.

30. The spray-dried composition of claim 29 having admixed therewith at least one of lactic acid, sodium lactate, sodium chloride, or a magnesium compound.

31. A pizza characterized in that at least part of the cheese on the pizza contains the composition of claim 1.

32. A pizza according to claim 31 wherein the pizza utilizes as the cheese-like component only the composition of claim 1.

33. A process for producing the product of claim 1 comprising:
   a. mixing at a temperature of at least 120°F. a synergistic combination of sodium caseinate and potassium caseinate, a fat having a melting point of 130°F. or less and water; the weight ratio of the caseinates to fat being from 1:2 to 2:1, the weight ratio of water to the total of the caseinates and fat being from 1:2 to 3:1 and the weight ratio of sodium caseinate to potassium caseinate being 4:1 to 1:4; and
   b. cooling the mixture to a temperature below 95°F. to congeal the mixture.

* * * * *